United States Patent [19]

Tumminelli et al.

[11] Patent Number: 5,194,079

[45] Date of Patent: Mar. 16, 1993

[54] METHOD OF FORMING AN OPTICAL CHANNEL WAVEGUIDE BY THERMAL DIFFUSION

[75] Inventors: Richard P. Tumminelli, Ashland; Farhad Hakimi, Watertown; John R. Haavisto, Marshfield Hills, all of Mass.

[73] Assignee: The Charles Stark Draper Laboratory, Inc., Cambridge, Mass.

[21] Appl. No.: 830,932

[22] Filed: Feb. 4, 1992

Related U.S. Application Data

[63] Continuation-in-part of Ser. No. 761,416, Sep. 17, 1991.

[51] Int. Cl.[5] .................... C03C 25/02; C03C 21/00
[52] U.S. Cl. .................... 65/3.110; 65/60.2; 65/60.52; 65/3.14; 219/121.29; 219/121.8; 385/131; 427/376.2; 427/397.7; 427/554
[58] Field of Search .......... 65/3.11, 31, 30.1, 60.2, 65/60.53, 3.14, 117, 102, DIG. 4; 156/663; 219/121.29, 121.8; 427/162, 167, 53.1, 35, 36, 372.2, 375, 376.2, 397.7; 385/129, 130, 131

[56] References Cited

U.S. PATENT DOCUMENTS

| 4,676,820 | 6/1987 | Le Sergent et al. | 65/18.2 |
| 4,756,734 | 7/1988 | Kersten et al. | 65/31 |
| 4,765,819 | 8/1988 | Kersten et al. | 65/18.2 |
| 4,886,538 | 12/1989 | Mahapatra | 264/1.4 |

FOREIGN PATENT DOCUMENTS 61-158303  7/1986  Japan .

Primary Examiner—Robert L. Lindsay
Attorney, Agent, or Firm—Iandiorio & Dingman

[57] ABSTRACT

A method of forming an optical channel waveguide includes forming on a substrate a waveguide layer of silica doped with an index of refraction raising dopant whose concentration profile in a first dimension includes a higher concentration region and an adjacent lower concentration region; and heating the waveguide layer along two spaced areas defined in the second and third dimension which define a path between them for diffusing the dopant along the first dimension from the higher concentration region to the lower concentration region to reduce the index of refraction of the higher concentration region in portions of the higher concentration region proximate the spaced areas and create a waveguide along the path.

8 Claims, 4 Drawing Sheets

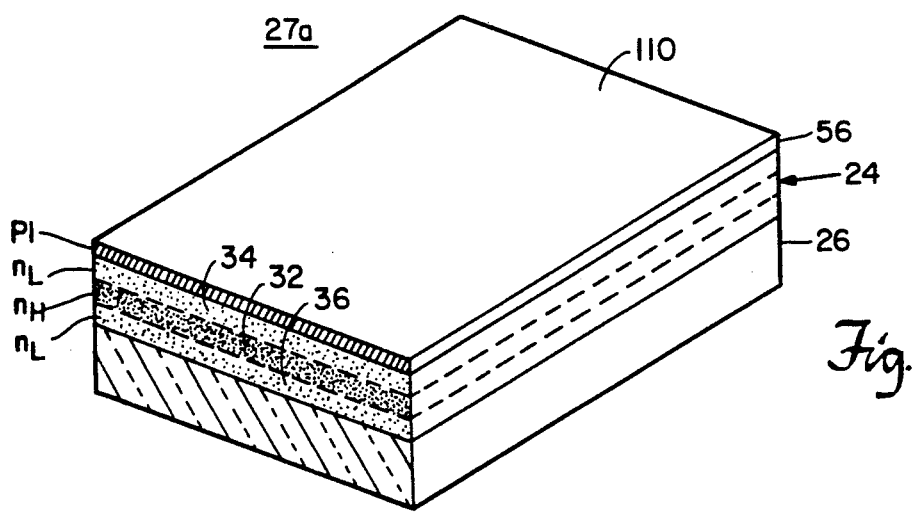
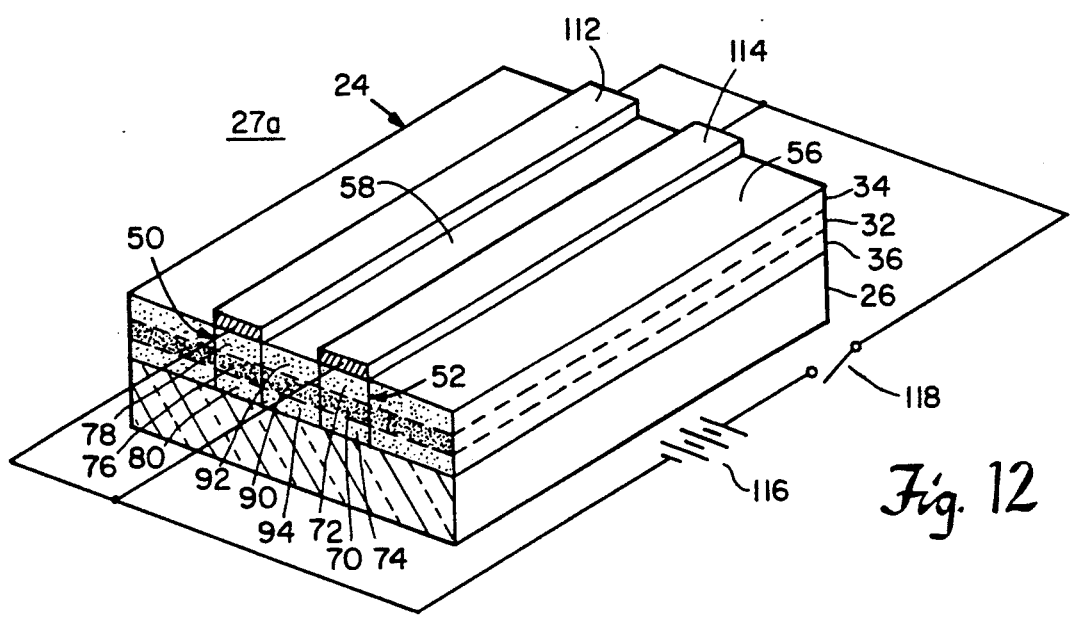
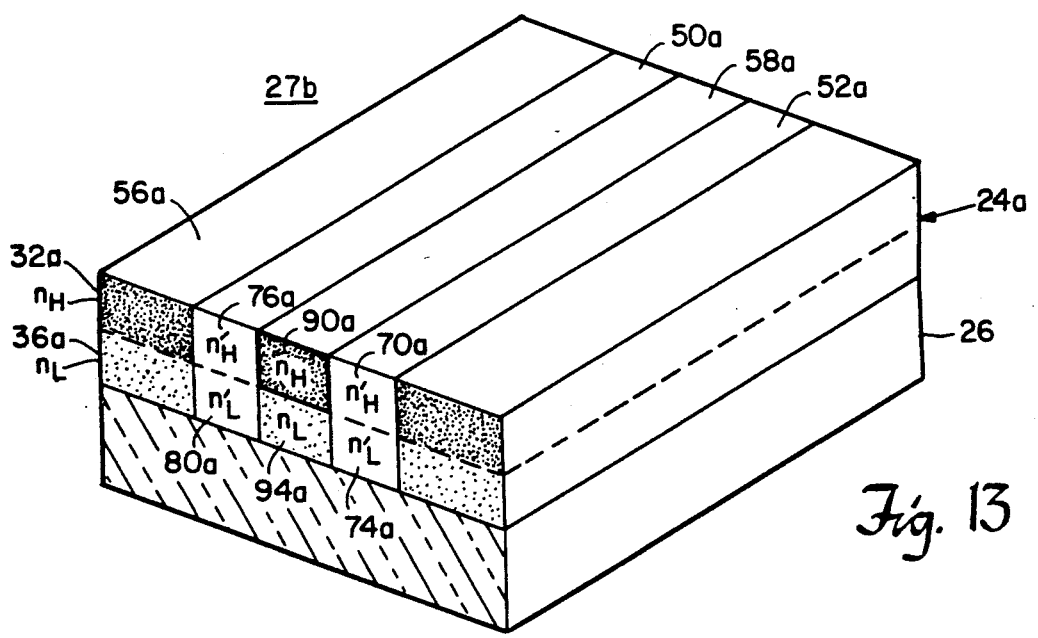

METHOD OF FORMING AN OPTICAL CHANNEL WAVEGUIDE BY THERMAL DIFFUSION

RELATED CASE

This application is a Continuation-in-Part of U.S. Ser. No. 07/761,416, filed Sep. 17, 1991, entitled "Method of Forming an Optical Waveguide by Selective Volatization" by Tumminelli et al.

FIELD OF INVENTION

This invention relates to a method of forming an optical channel waveguide, and more particularly to such a method which thermally diffuses a constituent in a specially profiled waveguide layer to raise the index of refraction along a path and create a waveguide.

BACKGROUND OF INVENTION

Planar waveguides in glass have been of interest for some time for making low-cost, high-performance passive optical components such as ring resonators, couplers, splitters and wavelength division multiplexers. Currently, two processes are widely used for making planar waveguides in glass. The first method is ion exchange that uses a glass substrate containing mobile ions which can be locally exchanged for another ion which will increase the refractive index. For example, a glass containing sodium ions could be masked to define a waveguide path, then immersed in a molten potassium salt bath where the sodium would be exchanged for the potassium, which would result in a higher index of refraction in the path and create a waveguide. This ion exchange technique has certain shortcomings. The waveguide is formed on the surface of the glass and losses are associated with the top surface roughness and with ionic defects occurring during the exchange. Recent advances in this technology have led to propagation losses of 0.01 dB/cm, but this requires careful fabrication techniques including judicious choice of materials and glass substrate composition and precise process control. Another technique is to grow glass on a silicon substrate by flame hydrolysis deposition (FHD) and form waveguides by reactive ion etching. Losses of 0.01 dB/cm have been achieved. This process is the same as that which is used to make fiber optic preforms from which telecommunications grade fiber can be drawn. The fiber has a loss of 1 dB/Km or $10^{-5}$ dB/cm, three orders of magnitude lower than losses achieved in planar form. The material, therefore, cannot be the cause of the losses in planar form. Waveguides formed by this process employ masking and subsequent etching to remove portions of the substrate and leave the raised, ribbed waveguide. A number of different etching techniques can be used. Etching techniques, however, leave the ribbed waveguide with rough edges that contribute to higher losses. Further processing is required to attempt to reduce the roughness and produce smoother boundaries.

SUMMARY OF INVENTION

It is therefore an object of this invention to provide an improved method of forming an optical waveguide.

It is a further object of this invention to provide such an improved method for more easily and inexpensively fabricating a lower loss waveguide.

It is a further object of this invention to provide such an improved method which results in a waveguide having a more uniform index of refraction profile along its length.

It is a further object of this invention to provide such an improved method for making a buried optical waveguide.

It is a further object of this invention to provide such an improved method of fabricating a waveguide without etching.

The invention results from the realization that a low loss, optical channel waveguide can be made by forming on a substrate a waveguide layer with an index of refraction raising dopant whose concentration profile in a first dimension includes a high concentration region and an adjacent lower concentration region and heating the waveguide layer along two spaced areas extending in second and third dimensions defining a path between them to cause diffusion of the dopant in the first dimension proximate the spaced area to reduce the index of refraction of the higher concentration regions proximate the spaced areas and create a waveguide along the path.

This invention features a method of forming an optical channel waveguide. There is formed on a substrate a waveguide layer of silicon doped with an index of refraction raising dopant whose concentration profile in a first dimension includes a higher concentration region and an adjacent lower concentration region. The waveguide layer is heated along two spaced areas defined in a second and third dimension which define path between them for diffusing the dopant along the first dimension from the higher concentration region to the lower concentration region to reduce the index of refraction of the higher concentration region in portions of the higher concentration region proximate the spaced areas, thereby creating a waveguide along the path.

In a preferred embodiment the concentration profile may include two lower concentration regions bounding the high concentration region. The index raising dopant may include aluminum. The heating may be accomplished with an irradiating beam. The irradiating beam may be a particle beam or photon beam such as a laser beam. The heating may alternately be achieved with heater elements on the spaced areas. The heating is accomplished up to the transition temperature of the waveguide layer.

The invention also features a method of forming an optical channel waveguide by forming on a substrate a waveguide layer of an index of refraction raising dopant whose concentration profile in a first dimension includes a higher concentration region bounded by two lower concentration regions. The waveguide layer is then heated along two spaced areas defined in a second and third dimension for diffusing the dopant along the first dimension from the higher concentration region to the lower concentration region to reduce the index of refraction of the higher concentration region in the portion of the higher concentration region proximate the spaced areas to thereby create a waveguide along the path.

DISCLOSURE OF PREFERRED EMBODIMENT

Other objects, features and advantages will occur to those skilled in the art from the following description of a preferred embodiment and the accompanying drawings, in which.

Figure 3:
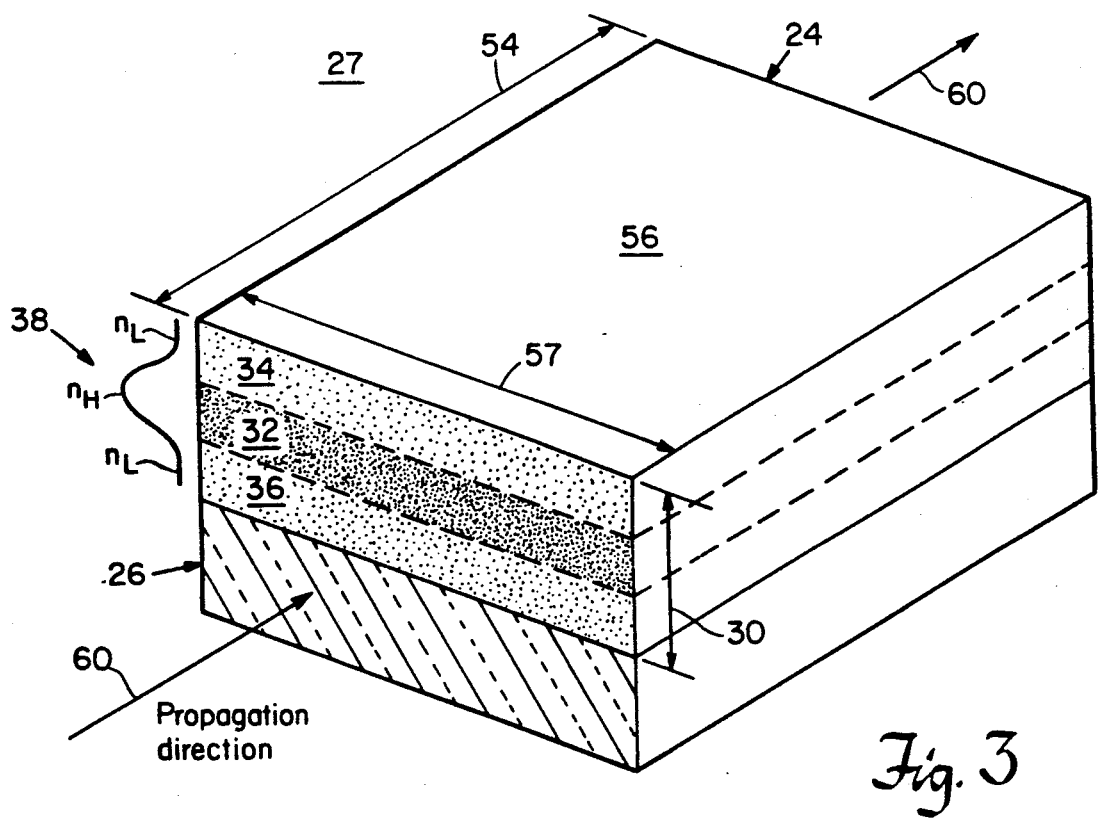
FIG. 3 is a three-dimensional view of a substrate bearing an aluminum-doped silica layer having a concentration and consequent index of refraction profile according to this invention formed with a high concentration region bounded by two low concentration regions.
Figure 7:
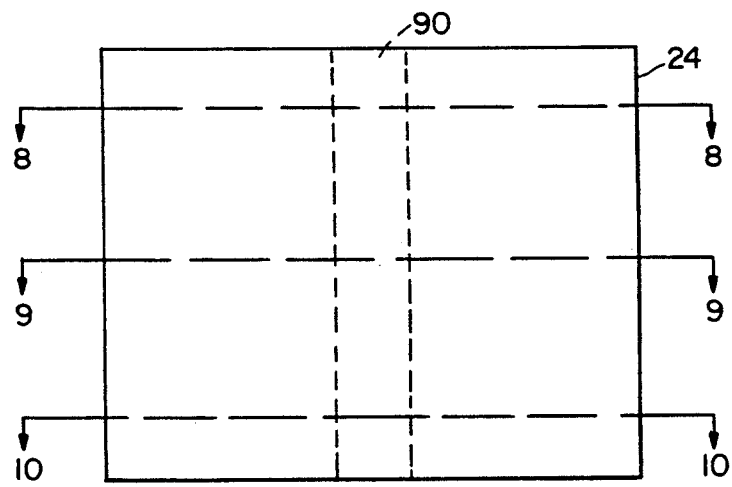
FIG. 7 is a top plan view of a waveguide such as shown in FIG. 3 upon completion of the diffusion after heating by the laser.
Figure 8:
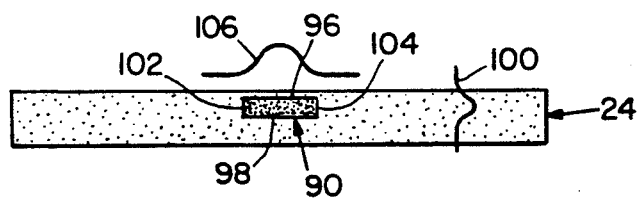
Figure 9:
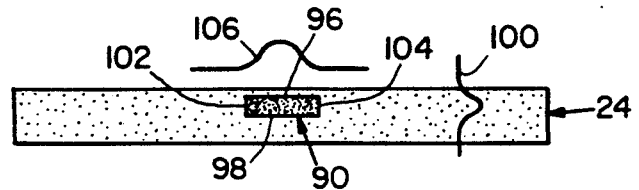
Figure 10:
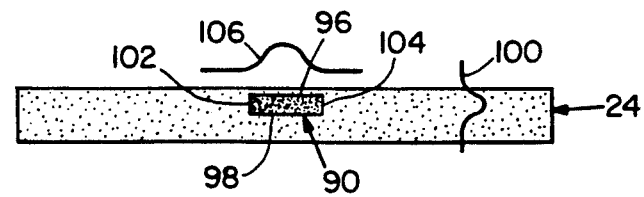

FIGS. 8, 9 and 10 illustrate the cross-sectional index of refraction profile at three arbitrary points at sectional lines 8—8, 9—9 and 10—10, respectively, of FIG. 7;

FIG. 11 is a three-dimensional view of a substrate bearing an aluminum doped silica layer such as shown in FIG. 3, where the aluminum doped silica layer is covered with a platinum layer;

FIG. 12 is a three-dimensional view similar to FIG. 11 with the platinum layer etched away everywhere except over the spaced areas to form two heating elements; and FIG. 13 is a three-dimensional view similar to FIG. 3 with only one lower concentration region adjacent a higher concentration region.

The invention may be accomplished by forming on a substrate a waveguide layer of silica doped with an index of refraction raising dopant whose concentration profile in a first dimension includes a higher concentration region and an adjacent lower concentration region. The substrate may be a silica wafer of three- or six-inch diameter, and from 20 microns to 1 millimeter in thickness, or the substrate may be a silicon wafer of 20 mils or so thickness. The high and low concentration regions may be approximately 5 microns in thickness. The dopant may be any of a number of index raising materials including germanium, aluminum, titanium, zirconium, phosphorous or antimony. In this preferred embodiment, aluminum is the dopant used. In the high concentration region there is a 5 mole percent proportion of aluminum with respect to silica which gives an index of refraction $n_H$ equal to 1.4700. The low concentration of the dopant may contain no aluminum so that the low concentration region is simply pure fused silica giving an index of refraction of $n_L$ equal to 1.4585.

Following the formation of this specially profiled waveguide layer, heat is applied to it along two spaced areas defined in the second and third dimension. For example, if the profile in the first dimension is referred to as thickness then the second and third dimension may be length and width of the waveguide layer. The two spaced areas define a path between them which will become the channel waveguide according to this invention. The heat applied along the two spaced areas diffuses the aluminum dopant along the direction of the first dimension from the higher concentration region to the lower concentration region, thereby reducing the index of refraction of the higher concentration region in portions of the higher concentration region proximate the spaced areas, and creating a channel waveguide along that path in the waveguide layer. The higher the difference between the high index of refraction $n_H$ and the low index of refraction $n_L$, referred to as $\Delta_n$, the narrower and sharper will be the resulting waveguide.

The heat may be applied by photon beam such as a laser beam, or it may be applied by applying heat directly through heater elements or electrodes. The temperature required to be applied varies with the type and amount of the dopant used, but is characterized as the transition temperature of the waveguide layer, typically in the range of 1500°-1700° C.

The step of forming the waveguide layer on the substrate may include depositing a layer such as by flame hydrolysis deposition, or growing it as in a germanium crystal growing process, or a solgel process may be used.

Figure 1:
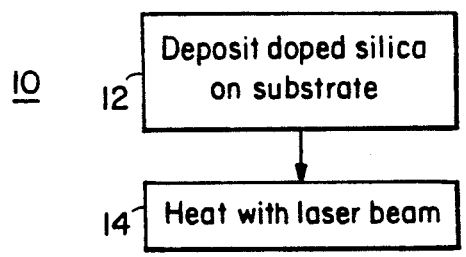
FIG. 1 is a simplified block diagram of the method according to this invention.

There is shown in FIG. 1 a simplified diagram of the method 10 of forming an optical waveguide according to this invention which includes first depositing a doped silica layer on a substrate in step 12 and then heating two spaced areas along the layer such as with a laser beam in step 14 to create a waveguide layer in which the concentration of the dopant and thus the index of refraction varies in a predetermined manner over the thickness of the layer. Then two spaced areas on the surface of the waveguide layer are heated, such as with a laser, to cause the dopant to diffuse from the higher concentration areas to the lower concentration areas in those portions proximate the heated spaced areas, in order to create a waveguide in the path between the heated spaced areas.

Figure 2:
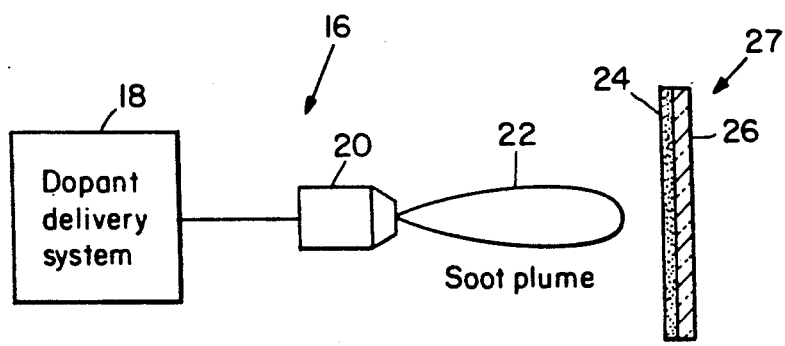
FIG. 2 is a schematic diagram of a flame hydrolysis deposition apparatus for depositing a silica layer on a substrate according to this invention.

A conventional flame hydrolysis deposition system 16, FIG. 2, employs a dopant delivery system 18 and torch 20 which produces a soot plume 22 that deposits a layer 24 of suitably doped silica on substrate 26 to create optical channel waveguide 27.

Figure 4:
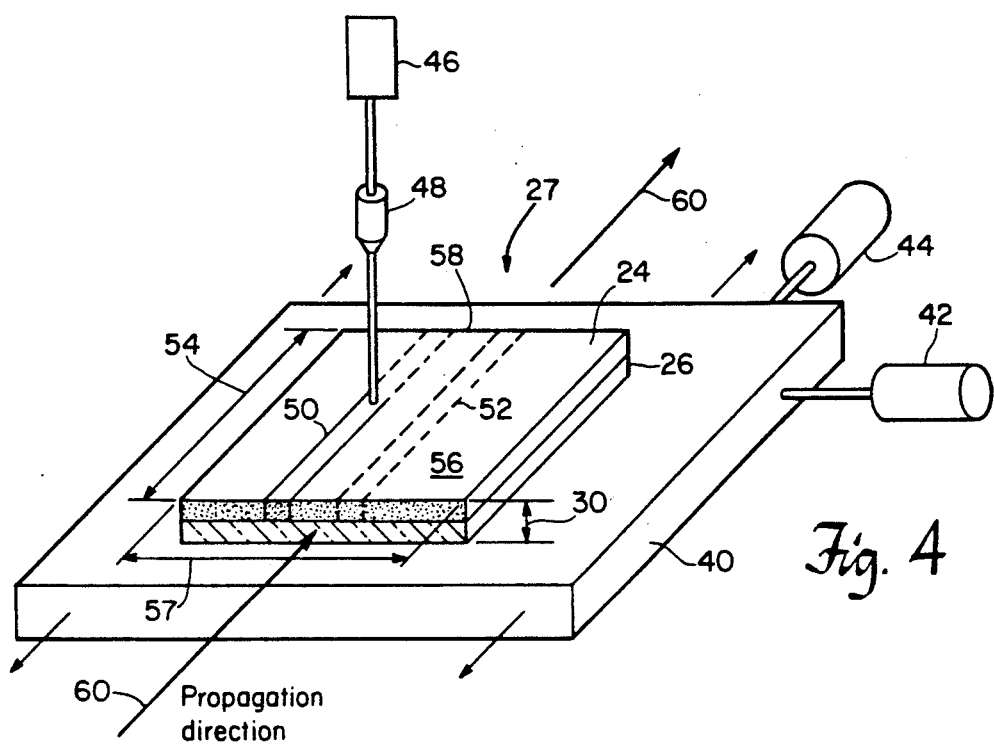
FIG. 4 is a schematic diagram of a laser and an X,Y table for heating two spaced areas on the silica layer formed on the substrate in FIG. 1.

The concentration of the dopant such as aluminum is varied during the deposition process to create a concentration profile which varies in the thickness dimension 30, FIG. 3, so that there is a region 32 of high dopant concentration and high index of refraction $n_H$ surrounded by two regions 34 and 36 of low dopant concentration and low index of refraction $n_L$. The characteristic profile 38 is pictured at the left in FIG. 3 with the lower $n_L$ and higher $n_H$ regions labelled. In this form, waveguide 27 is mounted on X,Y table 40, FIG. 4, driven by X drive motor 42 and Y drive motor 44, to enable a laser such as $CO_2$ laser 46 through an objective lens system 48, to irradiate and heat two spaced areas 50 and 52 along the length 54 of the top surface 56 of waveguide 27. The two heated areas 50 and 52 are spaced apart along the width dimension 56 to create a path 58 between them which will become the channel waveguide. In the construction shown in FIGS. 3 and 4, the channel waveguide will be finally constructed along path 58 where the propagation direction is indicated by arrows 60. Similar arrows have been indicated and labelled in FIG. 3 along with surface 56, length dimension 54, and width dimension 57 for ease of understanding and orientation of FIGS. 3 and 4.

Figure 5:
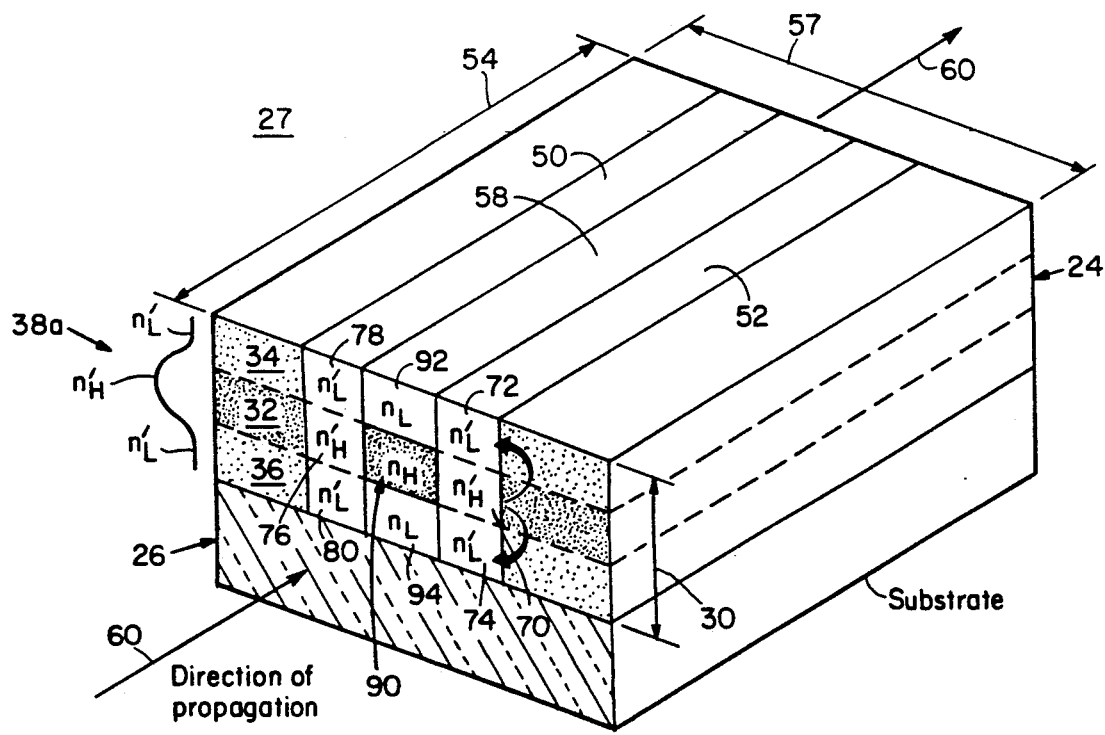
FIG. 5 is a view similar to FIG. 3 illustrating the diffusion of the aluminum dopant from the higher concentration region to the lower concentration regions in the heated areas.
Figure 6:
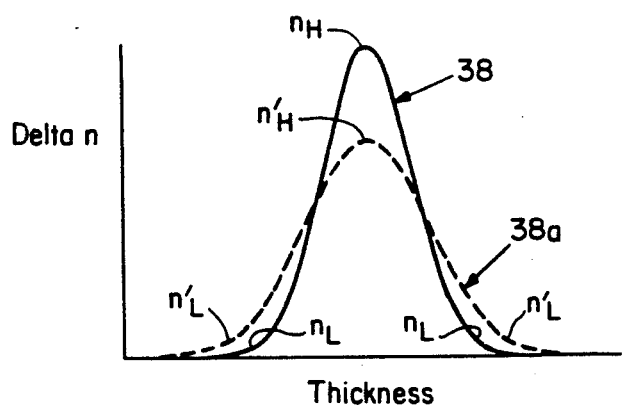
FIG. 6 is an illustration of the dopant concentration and index of refraction profile in the heated areas before and after heating.

The heat applied to waveguide 24 through spaced areas 50 and 52 causes the aluminum dopant to diffuse from the higher concentration region 32 to the two neighboring lower concentration regions 34 and 36 in the portions of those regions associated with the heated spaced areas 50 and 52. Thus the diffusion from section 72, FIG. 5, into sections 70 and 74 reduces the index of refraction in section 70 from $n_H$ to a lower index of refraction $n'_H$, and raises the index of refraction in sections 72 and 74 from a lower index of refraction $n_L$ to a somewhat higher one, $n'_L$. A similar diffusion and change in indices of refraction occur in sections 76, 78 and 80 associated with the heated spaced area 50. This results in a concentration/index of refraction profile 38a in those areas where the highest index of refraction is somewhat lower than in path 58. Thus the actual waveguide channel, section 90, has a high index of refraction $n_H$ surrounded by lower index of refractions in the sections 70, 72 and 74, 76, 78 and 80, as well as sections 92 and 94 which have the original low index of refraction $n_L$. Section 90 then is a buried channel waveguide. The comparison of profiles 38 and 38a can be seen more clearly in FIG. 6, where the higher index of refraction $n_H$ of the original waveguide layer can be seen to be much higher than the final high index of refraction $n'_H$ after the heating. Conversely, the lower index of refraction $n'_L$ after heating is somewhat higher than the lower index of refraction $n_L$ before heating.

The smooth boundary condition of the waveguide fabricated according to the technique of this invention is graphically depicted in FIG. 7, where waveguide layer 24, shown in top plan view, depicts waveguide section 90, which is smooth on its top 96 and its bottom 98, as indicated by index of refraction profile 100 and is smooth on both its sides 102, 104 as indicated by its index of refraction profile 106, as shown in FIGS. 8, 9 and 10.

Although thus far the heating has been accomplished using a laser, this is not a necessary limitation of the invention, as any other suitable means of heating may be used. For example, a platinum coating 110, FIG. 11, may be placed over the top surface 56 of waveguide layer 24, and then etched away, leaving but two elongated heater electrodes 112, 114, FIG. 12, which extend over the spaced areas 50, 52. A power source such as battery 116 is then connected through switch 118 to both electrodes 112 and 114 to apply heat to the areas 50 and 52.

Although thus far the embodiments pictured have been of a buried waveguide, wherein the waveguide layer consists of a concentration or index of refraction profile which includes a higher concentration/higher index of refraction portion bounded by two lower concentration portions of lower indices of refraction, this is not a necessary limitation of the invention. For example, a surface waveguide can be formed in the same manner as explained previously, by utilizing a waveguide layer 24a, FIG. 13, which includes a higher concentration region 32a bounded only on its lower side by lower concentration region 36a so that the waveguide section 90a ends up at the surface 56a.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of forming an optical channel waveguide comprising:

forming on a substrate a waveguide layer of silica doped with an index of refraction raising dopant whose concentration profile in a first dimension includes a higher concentration region and an adjacent lower concentration region; and heating said waveguide layer along two areas, defined in a second and third dimension, spaced to define a path between them, said heat diffusing siad dopant along the first dimension from the higher concentration region to the lower concentration region to reduce the index of refraction of the higher concentration region in portions of said higher concentration region beneath said spaced areas and create a waveguide along said path.

2. The method of claim 1 in which said concentration profile includes two lower concentration regions bounding said high concentration region.

3. The method of claim 1 in which said second index raising dopant includes aluminum.

4. The method of claim 1 in which the heating is accomplished with an irradiating beam.

5. The method of claim 4 in which the irradiating beam is a laser beam.

6. The method of claim 1 in which the heating is to the transition temperature of diffusing of the layer.

7. The method of claim 1 in which the heating is accomplished by heater elements on the spaced areas.

8. A method of forming an optical channel waveguide comprising:

forming on a substrate a waveguide layer of silica doped with an index of refraction raising dopant whose concentration profile in a first dimension includes a higher concentration region bounded by two lower concentration regions; and heating said waveguide layer along two spaced areas defined in a second and third dimension, said heat diffusing said dopant along the first dimension from the higher concentration region to the lower concentration regions to reduce the index of refraction of said higher concentration region in the portions of said higher concentration region beneath said spaced areas and create a waveguide along said path.

* * * * *